United States Patent [19]

Alinovi

[11] Patent Number: 5,003,667

[45] Date of Patent: Apr. 2, 1991

[54] AUTOMATIC SKINNER FOR NON-SCALY FISH

[75] Inventor: Mario B. Alinovi, Parma, Italy

[73] Assignee: Omar S.n.c. di Mario Baiocchi Alinovi & C., Parma, Italy

[21] Appl. No.: 531,284

[22] Filed: May 31, 1990

[30] Foreign Application Priority Data

Oct. 18, 1989 [IT] Italy ................ 40153 A/89

[51] Int. Cl.$^5$ .................................. A22B 5/16
[52] U.S. Cl. .................... 452/125; 452/127
[58] Field of Search .................. 17/62, 50, 21

[56] References Cited

U.S. PATENT DOCUMENTS

| | | | |
|---|---|---|---|
| 4,378,613 | 4/1983 | Crouch | 17/62 |
| 4,466,344 | 8/1984 | Schill | 17/21 |
| 4,577,371 | 3/1986 | Simon | 17/21 |
| 4,784,056 | 11/1988 | Townsend | 17/50 |
| 4,793,026 | 12/1988 | Braeger et al. | 17/50 |

FOREIGN PATENT DOCUMENTS

| | | | |
|---|---|---|---|
| 520417 | 1/1958 | Canada | 17/45 |
| 2475855 | 8/1981 | France | 17/50 |

*Primary Examiner*—Willis Little
*Attorney, Agent, or Firm*—Thomas R. Vigil

[57] ABSTRACT

The skinner falls within the art field of machines utilized by the fish processing industry, and serves to remove the skins of non-scaly varieties such as cuttlefish, octopus and squid; operation is entirely automatic, from the entry of the fish onto an angled and tilted infeed surface right through to their collection with the skins removed.

3 Claims, 2 Drawing Sheets

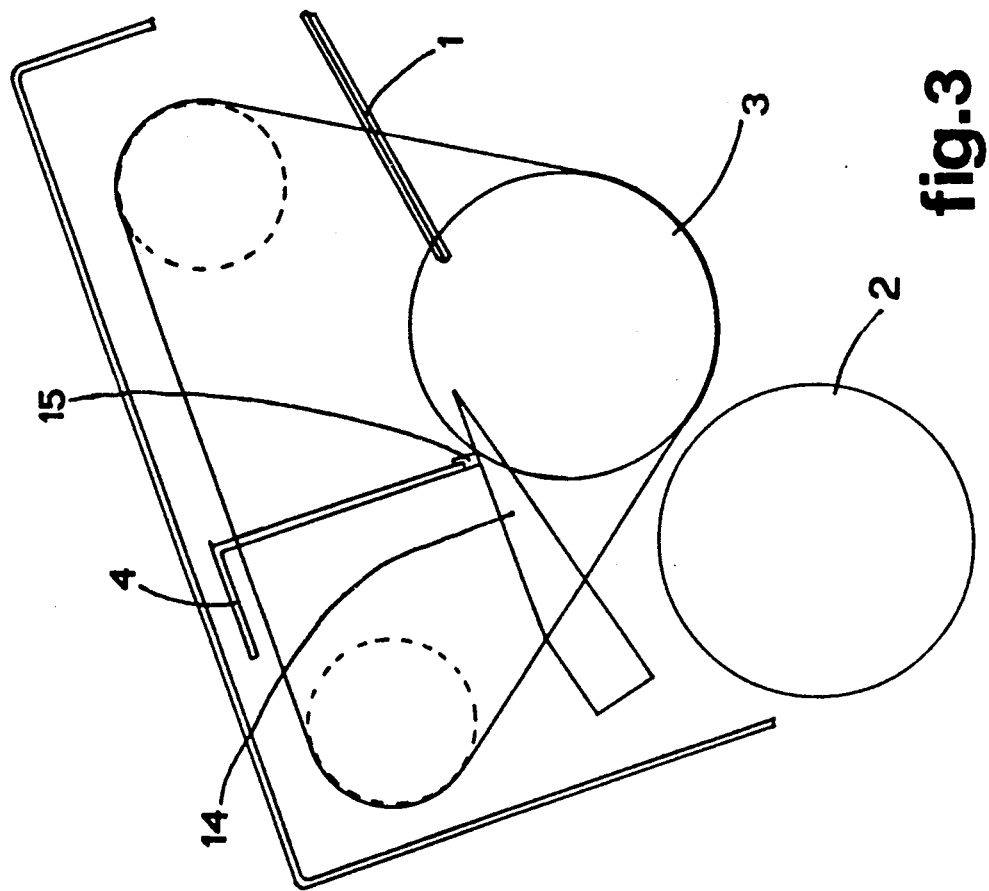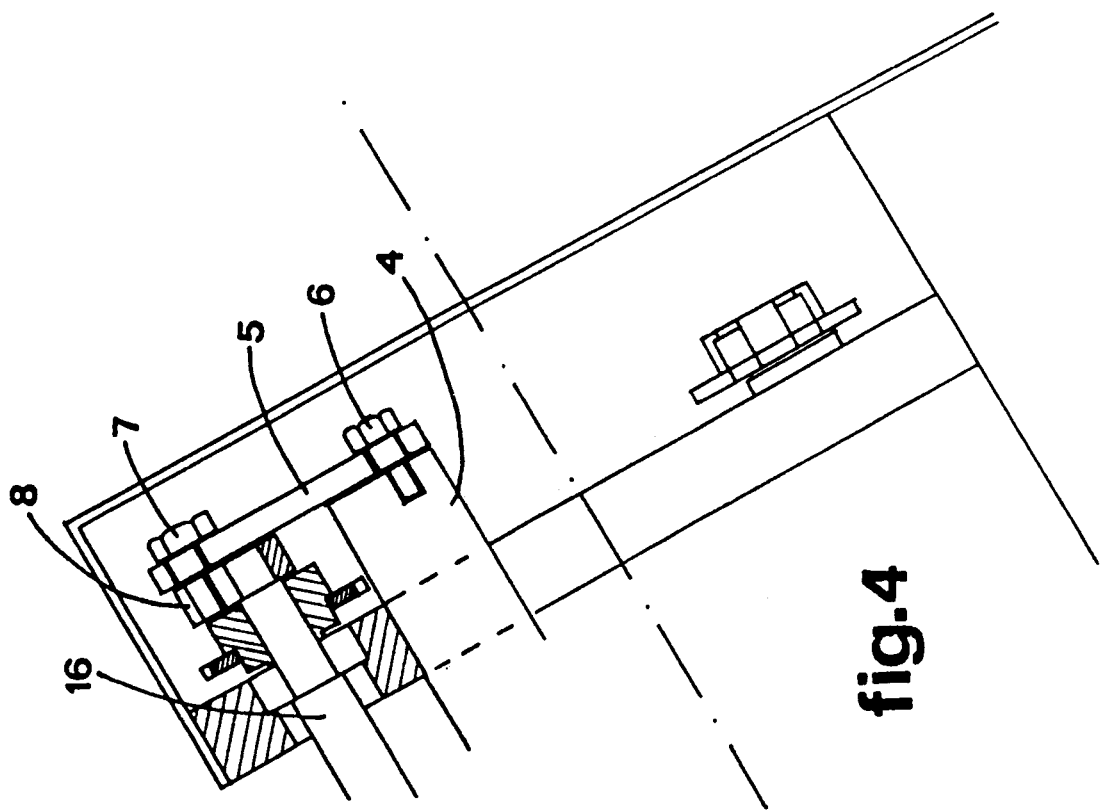

AUTOMATIC SKINNER FOR NON-SCALY FISH

BACKGROUND OF THE INVENTION

The present invention relates to an automatic machine for skinning non scaly fish, such as squid, octopus and cuttlefish.

The prior art embraces skinners for non-scaly fish which involve the operator placing the fish on a infeed surface that is angled down into a rotary skinning mechanism comprising a skinning roller, a tangential cleaning roller and a blade.

Pushed forward by the operator, the fish slides down onto the skinning roller and is urged against a blade which removes the skins; these are ejected downwards and collected in a container, whilst the skinned fish are conveyed away along a collection surface above.

A drawback of such skinning equipment is that it requires the continued presence of an operator to position the fish on the angled surface of the machine and bring about its entry into the roller assembly; the consequence of such a requirement is a high production cost.

Accordingly, the object of the present invention is to overcome the drawback in question, and more especially to render the infeed of fish into the skinner an automatic process, thereby dispensing with the need to employ operators for the purpose, and obtaining a notable saving in costs.

SUMMARY OF THE INVENTION

The stated object is fully realized in an automatic skinner for non-scaly fish according to the present invention, which is of the general type comprising an infeed surface, a skinning roller, a cleaning roller tangential to the skinning roller, and a blade; in the skinner disclosed, the infeed surface is supported by a frame angled in relation to a horizontal plane as if rotated about the axis of the skinning roller, such that the surface itself is inclined down toward the roller, and the plane occupied by the blade angled in relation to and directed down and away from the roller.

Also included are oscillating means that serve both to prevent jamming by assisting passage of the fish onto the skinning roller, and to cause the skinned fish to slide away toward a collection receptacle, and means by which to tilt the infeed surface, rollers, blade and oscillating means by rotating the support frame about a side of the infeed surface disposed normal to the axis of the skinning roller.

BRIEF DESCRIPTION OF THE DRAWINGS

The invention will now be described in detail, by way of example, with the aid of the accompanying drawings in which:

FIG. 3 shows the skinner in a side elevation viewed along the axis of the skinning roller;

FIG. 4 shows the skinner from above, viewed normal to the axis of the skinning roller.

DESCRIPTION OF THE PREFERRED EMBODIMENTS

Figure 1:
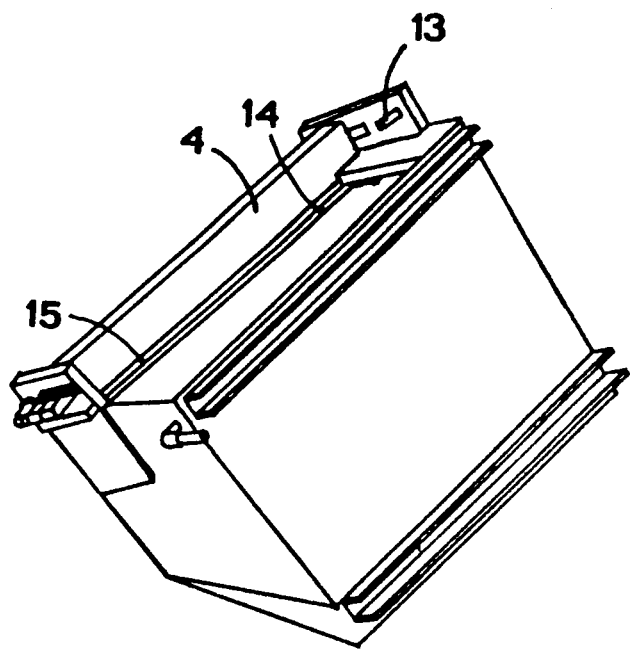
FIG. 1 is a perspective of the skinner, shown in its entirety.
Figure 2:
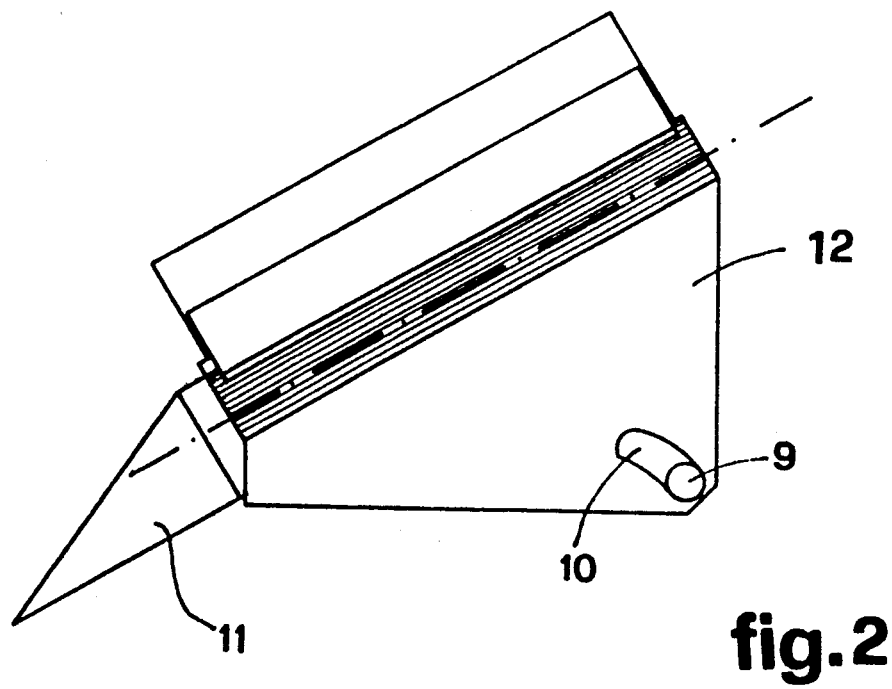
FIG. 2 shows the skinner in a side elevation normal to the of the skinning roller.

With reference to the drawings, 1 denotes an infeed surface onto which fish for skinning are deposited from a conveyor belt (not illustrated); the surface is angled downward toward a skinning roller 3 and a tangential cleaning roller 2 both disposed parallel to the longer side of the surface.

In addition, the surface can be tilted by rotation about one of its sides disposed perpendicular to the roller axes, through 30° ... 40° approx from the horizontal.

The tilt of the surface is adjustable by way of a pin 9 rigidly associated with the fixed frame of the roller mechanism and slidably accommodated by a slot 10 fashioned in the support frame 12.

4 denotes a pushing bar, the bottom edge of which carries a scraper 15 embodied in nylon suitable for contact with foodstuffs and designed to adhere to the surface of a blade 14; the bar 4 is secured by a screw 6 to a rod 5, the rod connected by way of a further screw 7 to a crank 8, and the crank in turn keyed to a shaft 16 in such a way that the pushing bar 4 can be reciprocated through a rectilinear path by rotation of the shaft 16.

The skinner will also comprise a receptacle 11 in which to collect the skinned fish, and a receptacle (not illustrated) in which the skins are collected. The bar 4, scraper 15, rod 5, screws 6 and 7 and crank 16 together provide oscillating means, the twofold purpose of which is to assist the initial passage of the fish onto the skinning roller 3, to the end of preventing blockages, and to cause the skinned fish to slide away into the collection receptacle 11.

The pin 9 and the slot 10, together, provide means by which to alter the degree of tilt of the infeed surface, rollers, blade and oscillating means.

13 denotes a tube positioned uppermost in the skinner, which is designed to direct water toward the skinning roller and thus cause the skinned fish to slide away more readily into the receptacle 11. In operation of the skinner, the infeed surface 1 enables unskinned fish running off the conveyor to slide automatically toward the roller 3 and the blade 14, and once the skin has been removed, down toward the lower end of the roller.

The reciprocating action of the pushing bar 4 has the effect of preventing any accumulation of fish, recirculating any that happen to remain unskinned, and ensuring that skinned fish slide away toward the collection receptacle 11 by overcoming static friction, to which the fish would become subject if not kept constantly in motion.

The skins removed from the fish drop into the relative collection receptacle.

What is claimed:

1. An automatic skinner for non-scaly fish, comprising a skinning roller (3);

a cleaning roller (2) disposed tangential to the skinning roller;

a blade (14), occupying a plane angled in relation to and directed down and away from the skinning roller;

a fish infeed surface (1), supported by a frame (12) that is angled in relation to a horizontal plane as if rotated about the axis of the skinning roller (3), such that the infeed surface (1) is inclined down toward the roller (3);

oscillating means that serve both to prevent jamming by assisting passage of the fish onto the skinning roller, and to cause the skinned fish to slide away toward a collection receptacle (11);

means by which to tilt the infeed surface support frame, the rollers, the blade and the oscillating means by rotating the support frame about a side of the infeed surface disposed normal to the axis of the skinning roller.

2. Automatic skinner for non-scaly fish as in claim 1, wherein oscillating means serving both to prevent jamming by assisting passage of the fish onto the skinning roller and to cause skinned fish to slide toward a collection receptacle, comprise a pushing bar (4) carrying a scraper (15) and secured by a screw (6) to a rod (5) that is connected in turn by way of a further screw (7) to a crank (8).

3. Automatic skinner for non-scaly fish as in claim 1, wherein means by which to tilt the infeed surface support frame, the rollers, the blade and the oscillating means consist in a pin (9) associated rigidly with the fixed frame of the skinner and slidably accommodated in a slot (10) fashioned in the tiltable support frame (12).

* * * * *